(12) United States Patent
LeBlanc et al.

(10) Patent No.: US 10,364,912 B2
(45) Date of Patent: Jul. 30, 2019

(54) THERMAL VOLUME CONTROL FOR AN ACTUATOR ASSEMBLY

(71) Applicant: Emerson Process Management Valve Automation, Inc., Houston, TX (US)

(72) Inventors: William K. LeBlanc, Mansfield, OH (US); Jason T. Hoffbauer, Upper Sandusky, OH (US)

(73) Assignee: Emerson Process Management Valve Automation, Inc., Houston, TX (US)

( * ) Notice: Subject to any disclaimer, the term of this patent is extended or adjusted under 35 U.S.C. 154(b) by 292 days.

(21) Appl. No.: 15/236,945

(22) Filed: Aug. 15, 2016

(65) Prior Publication Data

US 2018/0045327 A1     Feb. 15, 2018

(51) Int. Cl.
| F16K 1/18 | (2006.01) |
| F16K 1/22 | (2006.01) |
| F15B 15/14 | (2006.01) |
| F15B 15/24 | (2006.01) |
| F16K 31/122 | (2006.01) |

(Continued)

(52) U.S. Cl.
CPC ............ F16K 31/383 (2013.01); F15B 15/14 (2013.01); F15B 15/148 (2013.01); F15B 15/1447 (2013.01); F15B 15/24 (2013.01); F16K 1/18 (2013.01); F16K 1/221 (2013.01); F16K 31/122 (2013.01); F16K 31/163 (2013.01)

(58) Field of Classification Search
CPC .. F16K 31/122; F16K 31/1221; F16K 31/163; F16K 31/1635; F16K 31/383; F16K 31/002; F16K 1/18; F16K 1/221; F15B 15/14; F15B 15/1447; F15B 15/148; F15B 15/24

See application file for complete search history.

(56) References Cited

U.S. PATENT DOCUMENTS

| 2,787,126 A | 4/1957 | Kleczek |
| 4,423,748 A * | 1/1984 | Ellett ...................... F16K 31/56 |
| | | 137/315.29 |

(Continued)

FOREIGN PATENT DOCUMENTS

DE   10 2011 106629 A1   12/2012

OTHER PUBLICATIONS

Extended European Search Report for Application No. 17175737.0, dated Dec. 22, 2017.

*Primary Examiner* — Robert K Arundale
*Assistant Examiner* — Jonathan J Waddy
(74) *Attorney, Agent, or Firm* — Marshall, Gerstein & Borun LLP

(57) ABSTRACT

An actuator assembly includes a cylinder disposed in an actuator housing, the cylinder having a cylinder interior is in fluid communication with a source of pressurized fluid. A ram member has a piston head within the cylinder interior, and pressure on the piston head moves the ram member. An end of the ram member acts on a collar having a collar interior, and an end of a rod member is disposed within the collar interior. The rod member is displaceable relative to the collar such that the end of the rod member does not contact the collar. Accordingly, fluid in the cylinder interior acting on the ram member may expand due to thermal expansion without damaging a hard stop at an opposite end of the rod member and without losing system pressure by triggering a relief valve.

21 Claims, 4 Drawing Sheets

(51) Int. Cl.
 *F16K 31/163* (2006.01)
 *F16K 31/383* (2006.01)

(56) References Cited

U.S. PATENT DOCUMENTS

| | | | |
|---|---|---|---|
| 6,199,822 B1 | 3/2001 | Håkansson | |
| 2008/0083891 A1* | 4/2008 | Holliday | F16K 31/1221 |
| | | | 251/63.6 |
| 2013/0214188 A1* | 8/2013 | Young | F16K 31/44 |
| | | | 251/285 |

* cited by examiner

THERMAL VOLUME CONTROL FOR AN ACTUATOR ASSEMBLY

FIELD OF THE DISCLOSURE

This disclosure relates generally to valve actuators, and more particularly, to a thermal volume control for an actuator assembly.

BACKGROUND

Actuator assemblies including a piston-like ram member may use pressurized fluid to displace the ram member to move a closure member of a control valve between an open position and a closed position. Specifically, the ram member may have a piston head that is disposed within an interior of a cylinder, and fluid under pressure is provided to the cylinder interior to act on the piston head to displace the ram member. An end of the ram member may extend out of the cylinder and abut an end of a rod member, and the opposite end of the rod member may be directly or indirectly coupled to the closure member of the control valve. Accordingly, movement of the ram member by fluid pressure displaces the closure member of the control valve.

Often, fluid under pressure is provided in the cylinder interior to maintain the closure member of the control valve in an open position. The fluid under pressure may be provided by a manual hand pump or an electrical pump. Due to leakage in the system that brings the pressure to the threshold pressure, the manual pump may need to be periodically actuated to maintain fluid pressure in the system to a level that maintains the valve member in the open position. Alternatively, the electrical pump cycles on to increase pressure in the cylinder volume to maintain the valve member in the open position.

During the summer or when the system is subjected to relatively high temperatures, fluid in the system may subject to thermal expansion. This thermal expansion causes pressure in the system to increase, and the pressure increase acts on the ram member to provide a force that is greater than that necessary to maintain the closure member of the control valve in the open position. This excess force may damage a mechanical stop that prevents the rod member from displacing past a point corresponding to the fully open position to prevent damage to the closure member and/or the valve sear of the control valve. Accordingly, a relief valve may be triggered when the pressure increases past a maximum cracking pressure. However, after the temperature lowers, system pressure also lowers and the system pressure may be lower than the pressure necessary to maintain the closure member of the control valve in an open position. To increase system pressure, the manual pump must be actuated or the electrical pump must be cycled on. However, because the actuator assembly and the control valve may be at a remote location, it is expensive and time consuming to have a technician travel to the valve to operate the manual pump. Even with the electrical pump, the cycling on and off as the system fluid pressure increases and decreases is undesirable.

Conventional methods used to compensate for the thermal expansion of the system fluid typically utilize a bladder accumulator device plumbed into an operating port of the actuator assembly. The bladder accumulator device requires a pre-charged nitrogen head pressure on the topside of the bladder with a small volume of system fluid used by the actuator assembly. As the temperature increases and the system fluid expands, the bladder will compress the nitrogen and compensate for the thermal expansion of the system fluid to prevent system pressure from reaching the cracking pressure of the relief valve. Although this configuration is simple in concept, it is difficult to maintain the nitrogen gas head pressure in the topside of the bladder. Nitrogen gas at high pressures 2000 to 3000 psig will eventually leak out of the containment vessel of the bladder accumulator device. The small nitrogen molecule will leak by both conventional pipe thread fittings and straight thread O-ring sealed fittings. This slow gas egress will require the customer to periodically check and maintain the proper gas head pressure to ensure the function of the thermal compensation system.

Accordingly, there is a need to eliminate the use of the conventional bladder accumulator device while still preventing the system pressure from reaching the cracking pressure of the relief valve and while eliminating excessive pressure acting on the rod member that is coupled to the closure member of the control valve.

BRIEF SUMMARY OF THE DISCLOSURE

An actuator assembly includes an actuator housing extending along a housing axis from a first end to a second end opposite the first end, the actuator housing having at least one interior side surface defining an actuator interior. A cylinder extends along the housing axis from a first end to a second end opposite the first end, the second end of the cylinder being adjacent to the second end of the actuator housing, the cylinder having at least one interior side surface defining a cylinder interior. The cylinder interior is in fluid communication with a source of pressurized fluid, and the cylinder is disposed at least partially within the actuator interior. The cylinder has a cylinder aperture at the first end of the cylinder. A ram member extends along the housing axis from a first end to a second end opposite the first end, the second end of the ram member being disposed within the cylinder interior and the first end of the ram member being disposed outside of the cylinder interior. The ram member has a piston head disposed at the second end of the ram member, and a ram stem extends from the piston head to the first end of the ram member. A portion of the ram stem is slidably received in the cylinder aperture. A cross-sectional area of the piston head is greater than a cross-sectional area of the ram stem, and pressure from the source of pressurized fluid within the cylinder interior acts on the piston head to move the ram member relative to the cylinder between a first position and a second position. A collar extends along the housing axis from a first end to a second end opposite the first end, the second end of the collar being adjacent to or in contact with the first end of the ram member. The collar has at least one interior side surface defining a collar interior. A spring seat is disposed within the actuator interior, the spring seat extending along the housing axis from a first end to a second end opposite the first end, the spring seat having a base member that extends from along the housing axis from the first end of the seat spring towards the second end of the spring seat. The spring seat also includes a seating portion coupled to the base member, the base member having at least one interior side surface defining a base member interior. The base member has a base member aperture at the first end of the spring seat, and the first end of the collar is in contact with a portion of the base member surrounding the base member aperture. A resilient member is disposed within the actuator interior, the resilient member extending along the housing axis from a first end to a second end opposite the first end. The second end of the resilient member engages the seating portion of the spring seat to bias the second end of the spring seat towards the second end of the actuator housing. A rod member extends along the housing axis from a first end to a second end opposite the first end, and a portion of the rod member extends through the base member aperture such that the second end of the rod member is disposed within the collar interior. The first end of the rod member adapted to be directly or indirectly coupled to a control member of a control valve. An engagement member is coupled to the rod member at or adjacent to the second end of the rod member such that the engagement member is disposed within the collar interior. The rod member and the engagement member are displaceable relative to the collar such that the second end of the rod member does not contact a portion of the second end of the collar.

A method of assembling an actuator assembly includes disposing a cylinder within an actuator interior of an actuator housing, the actuator housing extending along a housing axis from a first end to a second end. The cylinder extends along the housing axis from a first end to a second end, the second end of the cylinder being fixed to the second end of the actuator housing. The method also includes disposing a first end of a ram member outside of the cylinder and within the actuator interior, and disposing a second end of the ram member within a cylinder interior of the cylinder such that pressure of a fluid introduced into the cylinder interior acts on the second end of the ram member to displace the ram member along the housing axis. The method further includes disposing a collar within the actuator interior, the collar having a first end and a second end, and the second end of the collar is contacted by the first end of the ram member. The method additionally includes disposing a spring seat within the actuator interior, wherein the first end of the collar engages a first portion of a spring seat. A first end of a resilient member is secured within the actuator interior such that a second free end of the resilient member engages a second portion of the spring seat to bias the spring seat towards the second end of the actuator housing. The method further includes disposing at least a portion of a rod member within the actuator interior, the rod member extending along an axis from a first end to a second end, and the second end of the rod member is slidably disposed in an a collar interior of the collar. An engagement member is coupled to the rod member at or adjacent to the second end of the rod member such that the engagement member is disposed within the collar interior, and the rod member and the engagement member are displaceable relative to the collar such that the second end of the rod member does not contact a portion of the second end of the collar. As the ram member displaces towards the first end of the actuator housing, the second end of the rod member displaces towards the first end of the actuator housing until a closure member coupled to the first end of the rod member is in a fully-closed position. As the ram member displaces towards the second end of the actuator housing, the second end of the rod member displaces towards the second end of the actuator housing such that the closure member is in an open (e.g., a fully-open) position. As the ram member displaces towards the first end of the actuator housing when the closure member is in the fully-closed position due to as thermal expansion of the fluid in the cylinder interior, the first end of the ram member displaces the collar towards the first end of the actuator housing but does not displace the rod member.

DETAILED DESCRIPTION

Figure 1:
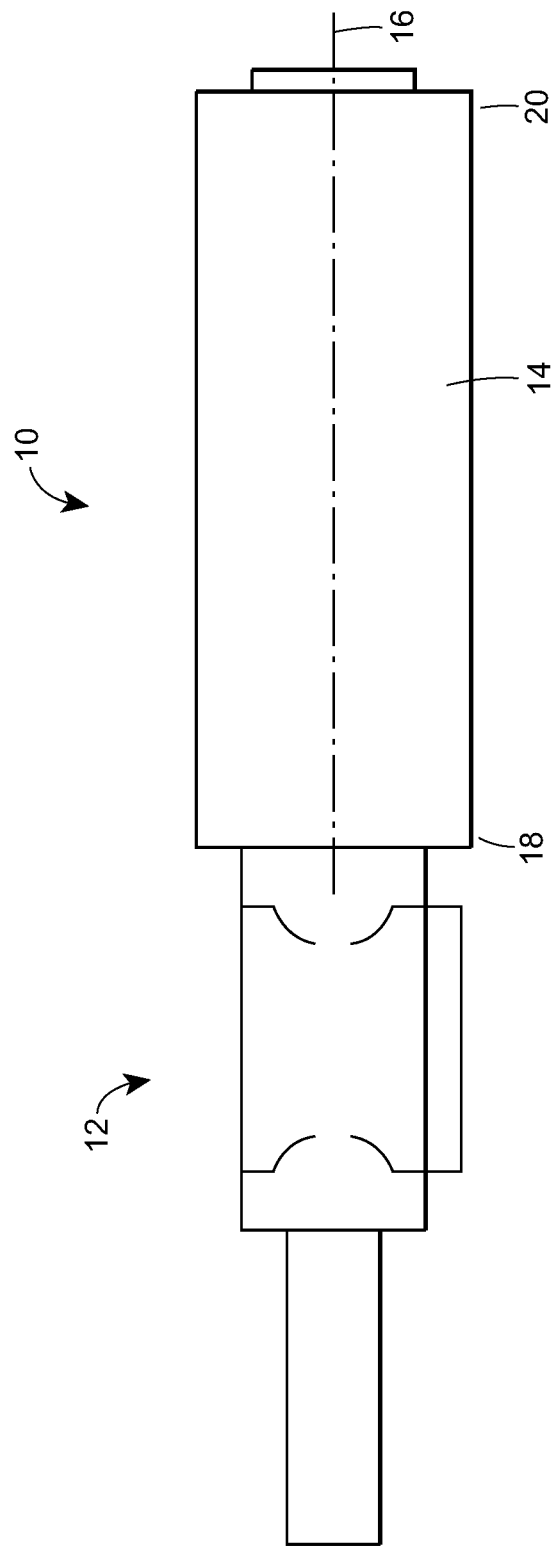
FIG. 1 is a front view of an embodiment of an actuator assembly coupled to a control valve.
Figure 2:
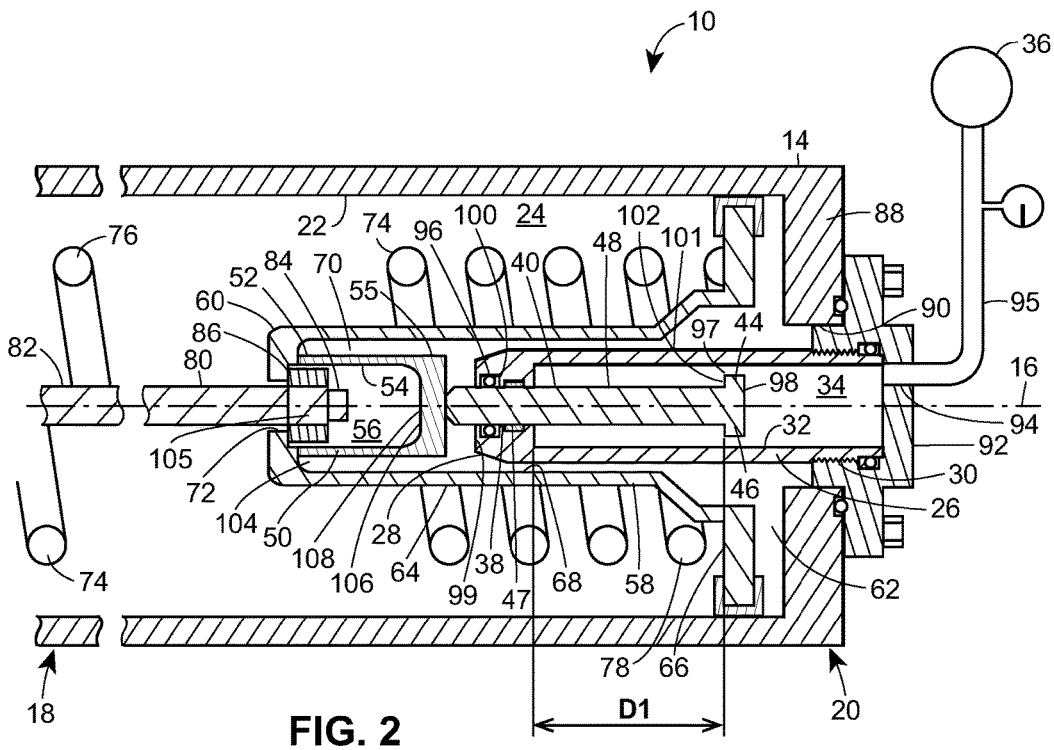
FIG. 2 is a partial sectional view taken of the embodiment of the actuator assembly of FIG. 1 taken along a housing axis of the actuator housing, the section view showing a ram member in a first position.

As illustrated in FIG. 1, an actuator assembly 10 may be operatively coupled to a control valve 12, and the actuator assembly 10 includes an actuator housing 14 extending along a housing axis 16 from a first end 18 to a second end 20 opposite the first end 18. As illustrated in FIG. 2, the actuator housing 14 has at least one interior side surface 22 defining an actuator interior 24. The actuator assembly 10 also includes a cylinder 26 extending along the housing axis 16 from a first end 28 to a second end 30 opposite the first end 28. The second end of the cylinder 26 is adjacent to and may be removably coupled to the second end 20 of the actuator housing 14, and the cylinder 26 is disposed at least partially within the actuator interior 24. The cylinder 26 has at least one interior side surface 32 defining a cylinder interior 34, the cylinder interior 34 being in fluid communication with a source 36 of pressurized fluid, such as a hydraulic fluid. The cylinder 26 also has a cylinder aperture 38 at the first end 28 of the cylinder 26.

The actuator assembly 10 additionally includes a ram member 40 extending along the housing axis 16 from a first end 42 to a second end 44 opposite the first end 42. The second end 44 of the ram member being disposed within the cylinder interior 34 and the first end 42 of the ram member being disposed outside of the cylinder interior 34. The ram member 40 has a piston head 46 disposed at the second end 44 of the ram member 40, and a ram stem 48 extends from the piston head 46 to the first end 42 of the ram member 40, wherein a portion 47 of the ram stem 48 is slidably received in the cylinder aperture 38. A cross-sectional area of the piston head 46 is greater than a cross-sectional area of the ram stem 48, and pressure from the source 36 of pressurized fluid within the cylinder interior 34 acts on the piston head 46 to move the ram member 40 relative to the cylinder 26 between a first position and a second position.

The actuator assembly 10 further includes a collar 50 extending along the housing axis 16 from a first end 52 to a second end 55 opposite the first end 52. The second end 55 of the collar 50 is adjacent to or in contact with the first end 42 of the ram member 40, and the collar 50 has at least one interior side surface 54 defining a collar interior 56. A spring seat 58 is disposed within the actuator interior 24, and the spring seat extends along the housing axis 16 from a first end 60 to a second end 62 opposite the first end 60. The spring seat 58 includes a base member 64 that extends from along the housing axis 16 from the first end 60 of the spring seat 58 towards the second end 62 of the spring seat 58, and the base member 64 has at least one interior side surface 68 defining a base member interior 70. The spring seat 58 also includes a seating portion 66 coupled to the base member 64. The base member 64 has a base member aperture 72 at the first end 60 of the spring seat 58, and the first end 52 of the collar 50 is in contact with a portion of the base member 64 surrounding the base member aperture 72. A resilient member 74 is disposed within the actuator interior 24, and the resilient member 74 may extend along the housing axis 16 from a first end 76 to a second end 78 opposite the first end 76. The second end 78 of the resilient member 74 may engage the seating portion 66 of the spring seat 58 to bias the second end 62 of the spring seat 58 towards the second end 20 of the actuator housing 14.

As illustrated in FIG. 2, the actuator assembly 10 further includes the rod member 80 extending along the housing axis 16 from the first end 82 to a second end 84 opposite the first end 82. A portion of the rod member 80 extends through the base member aperture 72 such that the second end 84 of the rod member 80 is disposed within the collar interior 56. The first end 82 of the rod member 80 is adapted to be directly or indirectly coupled to a closure member 125 (see FIGS. 5A and 5B) of the control valve 12. Referring again to FIG. 2, an engagement member 86 is coupled to the rod member 80 at or adjacent to the second end 84 of the rod member 80 such that the engagement member 86 is disposed within the collar interior 56. The rod member 80 and the engagement member 86 are displaceable relative to the collar 50 such that the second end 84 of the rod member 80 does not contact a portion of the second end 55 of the collar 50. As will be described in more detail below, with the collar 50 configured such that the second end 84 of the rod member 80 does not contact the portion of the second end 55 of the collar 50, pressure increases in the fluid system—including the cylinder interior 34—that may be caused by thermal expansion of the fluid in the fluid system allow the ram member 40 to displace to a third position (illustrated in FIG. 4) without applying further force on the second end 84 of the rod member 80, thereby preventing damage to a hard stop that may be preventing axial displacement of the rod member 80. In addition, pressure increases in the fluid due to thermal expansion can be safely absorbed by the ram member 40, the spring seat 58, and the resilient member 74 while avoiding an increase in threshold pressure that triggers a relief valve and requires a cycling of an electric pump or a manual application of pressure into the cylinder interior 34.

Turning to the actuator assembly 10 in more detail, FIG. 1 illustrates that the actuator housing 14 extends along the housing axis 16 from the first end 18 to the second end 20, and the first end 18 of the actuator housing 14 may be coupled to a portion of the control valve 12. Referring to FIG. 2, the actuator housing 14 may include at least one interior side surface 22 defining the actuator interior 24, and the at least one interior side surface 22 may have any suitable cross-sectional shape or shapes (when viewed along the housing axis 16) between the first end 18 and the second end 20. For example, the at least one interior side surface 22 may be a single cylindrical surface that may have a uniform (or substantially uniform) cross-sectional shape between the first end 18 and the second end 20. The actuator housing 14 may also include an end wall 88 at the second end 20 that may be normal (or substantially normal) to the housing axis 16. The end wall 88 may have an aperture 90 that receives and is sealed by an end cap 92 of the actuator housing 14. The end cap 92 may have an inlet passage 94 that is in fluid communication with the cylinder interior 34 and an and portion of a conduit 95 in communication with the source 36 of pressurized fluid, and the cylinder interior 34 may therefore be in fluid communication with a source 36 of pressurized fluid.

Still referring to FIG. 2, the cylinder 26 of the actuator assembly 10 may extend along an axis that may be coaxially aligned with the housing axis 16 from the first end 28 to the second end 30 opposite the first end 28. The second end 30 of the cylinder 26 is adjacent to and may be fixed to or removably coupled to a portion of the second end 20 of the actuator housing 14. For example, a portion of the second end 30 of the cylinder 26 may be threaded and may threadedly engage a threaded portion of the end cap 92 of the actuator housing 14. So configured, the cylinder 26 is disposed at least partially within the actuator interior 24, and the first end of the cylinder 26 is disposed within the actuator interior 24. The cylinder 26 may have a side wall 101 extending from the first end 28 to the second end 30, and the side wall 101 may include the at least one interior side surface 32 that at least partially defines the cylinder interior 34. The at least one interior side surface 32 may have any suitable cross-sectional shape or shapes (when viewed along the housing axis 16) between the first end 28 and the second end 30. For example, the at least one interior side surface 32 may be a single cylindrical surface that may have a uniform (or substantially uniform) cross-sectional shape between the first end 28 and the second end 30. The cylinder 26 may also include an end wall 96 at the first end 28 that may be normal (or substantially normal) to the housing axis 16. The end wall 96 may have a thickness that is equal to or greater than (e.g., 25% to 600% greater than) a thickness of the side wall 101. The end wall 96 may have an end surface 99 that may also partially define the cylinder interior 34. The end surface 99 may be planar (or substantially planar) and may be normal (or substantially normal) to the housing axis 16. The cylinder aperture 38 may be disposed at the first end 28 of the cylinder 26, and the cylinder aperture 38 may extend through the end wall 96 and the end surface 99. The cylinder aperture 38 may extend along an axis that is coaxially aligned with the axis of the ram member 40, such as the housing axis 16.

Referring again to FIG. 2, the actuator assembly 10 may include the ram member 40 that may extend along an axis that may be collinearly aligned with the housing axis 16, and the ram member 40 may extend from the first end 42 to the second end 44 opposite the first end 42. The second end 44 of the ram member 40 may disposed within the cylinder interior 34 and the first end 42 of the ram member 40 may be disposed outside of the cylinder interior 34. The piston head 46 of the ram member 40 is disposed at the second end 44 of the ram member 40, and the ram stem 48 extends from a bottom surface 102 of the piston head 46 to the first end 42 of the ram member 40. The bottom surface 102 of the piston head 46 may have any suitable shape or combination of shapes, and may, for example, be planar (or substantially planar). A cross-sectional area of the piston head 46 is greater than a cross-sectional area of the ram stem 48 to prevent the second end 44 of the ram member 40 from displacing through the cylinder aperture 38 of the cylinder 26. Pressure from the source 36 of pressurized fluid within the cylinder interior 34 acts on the piston head 46 (e.g., a top surface 98 of the piston head 46) to move the ram member 40 relative to the cylinder 26 between the first position (illustrated in FIG. 2) and the second position (illustrated in FIG. 3), and the first and second positions will be described in more detail below.

In some embodiments, the piston head 46 may have a cross-sectional shape (when viewed along the housing axis 16) that generally corresponds to a cross-sectional shape of the at least one interior side surface 32 of the cylinder 26. However, an outer edge portion of the piston head 46 may be inwardly offset from the at least one interior side surface 32 of the cylinder 26 so that an annular radial gap 97 exists between the outer edge portion of the piston head 46 and the at least one interior side surface 32 of the cylinder 26. For example, the piston head 46 may have a circular cross-sectional shape (when viewed along the housing axis 16) and the at least one interior side surface 32 of the cylinder 26 may have a circular cross-sectional shape. A diameter of the piston head 46 may have a value that is 30% to 95% that of a diameter of the at least one interior side surface 32 of the cylinder 26. The ram stem 48 may have a uniform (or substantially uniform) cross-sectional shape from the piston head 46 to the first end 42 of the ram member 40. However, in some embodiments, the cross-sectional shape of the piston head 46 may vary from the piston head 46 to the first end 42 of the ram member 40. The ram stem 48 may have suitable cross sectional shape such that the area of the cross-sectional shape is less than the cross-sectional area of the piston head 46. For example, the ram stem 48 may have a circular cross-sectional shape (when viewed along the housing axis 16), and a diameter of the ram stem 48 may have a value that is 30% to 95% that of the diameter of the piston head 46. The cylinder aperture 38 may have a cross-sectional shape that corresponds to the cross-sectional shape of the ram stem 48, and a small annular gap may exist between the cylinder aperture 38 and an outer surface of the ram stem 48. For example, the cylinder aperture 38 may have a circular cross-sectional shape (when viewed along the housing axis 16), and a diameter of the ram stem 48 may have a value that is 90% to 95% that of the diameter of the cylinder aperture 38. A portion of the ram stem 48 is slidably received in the cylinder aperture 38, and a seal 100 may be disposed in a surface of the cylinder 26 defining the cylinder aperture 38 to sealingly engage the portion of the ram stem 48 slidably received in the cylinder aperture 38.

As previously explained, the ram member 40 may displace along the housing axis 16 from the first position (illustrated in FIG. 2) and the second position (Illustrated in FIG. 3) and vice versa. In this first position of FIG. 2, which may correspond to a position in which the valve closure member 125 (see FIG. 5A) of the control valve 12 is in a fully closed position, the bottom surface 102 of the piston head 46 may be disposed a first distance D1 (along or parallel to the housing axis 16) from a portion of the cylinder 26 adjacent to the first end 28, such as the end surface 99 of the end wall 96 of the cylinder 26. In the second position of FIG. 3, which may correspond to a position in which the valve closure member 125 (see FIG. 5B) of the control valve 12 is in a fully open position, the bottom surface 102 of the piston head 46 may be disposed a second distance D2 (along or parallel to the housing axis 16) from the portion of the cylinder 26 adjacent to the first end 28, such as the end surface 99 of the end wall 96 of the cylinder 26. The first distance D1 is greater than the second distance D2. As will be explained in more detail, the ram member 40 may further displace along the housing axis 16 from the second position (illustrated in FIG. 3) to a third position (illustrated in FIG. 4). In this third position, which corresponds to a position in which system working fluid, including the fluid in the cylinder interior 34, undergoes a pressure increase due to increasing ambient temperature (while the valve closure member 125 of the control valve 12 (see FIG. 5A) continues to be in the fully closed position), the bottom surface 102 of the piston head 46 is disposed a third distance D3 (along or parallel to the housing axis 16) from the portion of the cylinder 26 adjacent to the first end 28, such as the end surface 99 of the end wall 96 of the cylinder 26. The second distance D2 is greater than the third distance D3.

Figure 3:
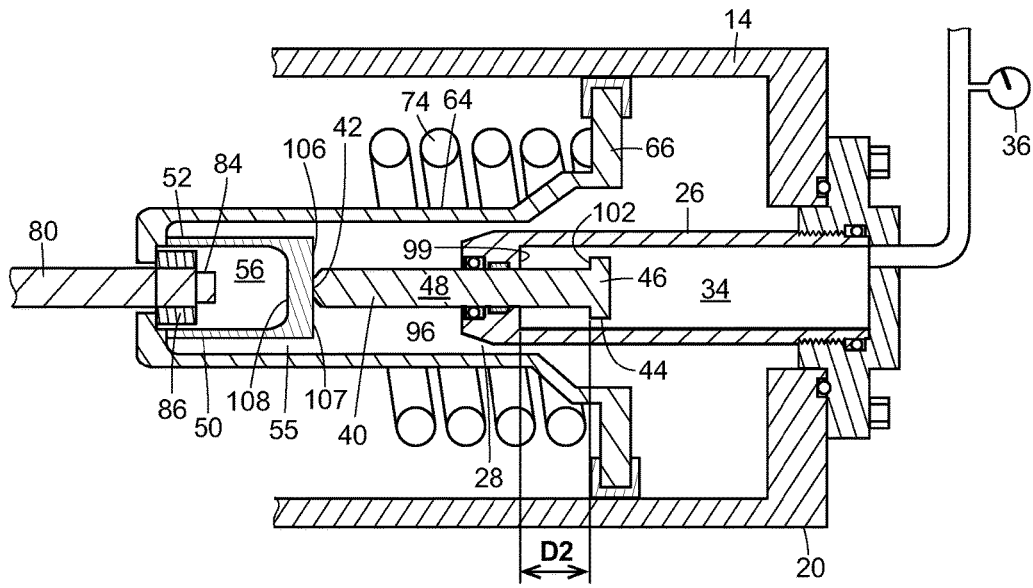
FIG. 3 is a partial sectional view taken of the embodiment of the actuator assembly of FIG. 1 taken along the housing axis of the actuator housing, the section view showing the ram member in a second position.

Referring to FIG. 2, the actuator assembly 10 further includes the collar 50 extending along an axis that may be coaxially aligned with the housing axis 16, and the collar 50 may extend from the first end 52 to the second end 55 opposite the first end 52. The collar 50 may have a side wall 104 that may have any suitable shape, such as a cylindrical shape. The side wall 104 may include the at least one interior side surface 54 that defines (or at least partially defines) the collar interior 56. The at least one interior side surface 54 may be sized to receive the engagement member 86 such that the engagement member 86 may displace along the housing axis 16 and not contact the at least one interior side surface 54. That is, an annular gap may be disposed between a side surface 105 of the engagement member 86 and the at least one interior side surface 54 such that no portion of the side surface 105 of the engagement member contacts a portion of the at least one interior side surface 54 of the collar 50 when the engagement member 86 and the rod member 80 displace along the housing axis 16. As illustrated in FIG. 3, an end wall 106 may be disposed at the second end 55 of the collar 50, and the end wall 106 may be normal or substantially normal to the housing axis 16. The end wall 106 may be defined by an outer surface 107 and an inner surface 108, and the inner surface 108 may define (or at least partially define) the collar interior 56. Because pressure within the cylinder interior 34 acts on the piston head 46 to displace the ram member 40 towards the collar 50, the second end 55 of the collar 50 (e.g., the outer surface 107 of the end wall 106) may be adjacent to or in contact with the first end 42 of the ram member 40.

Figure 4:
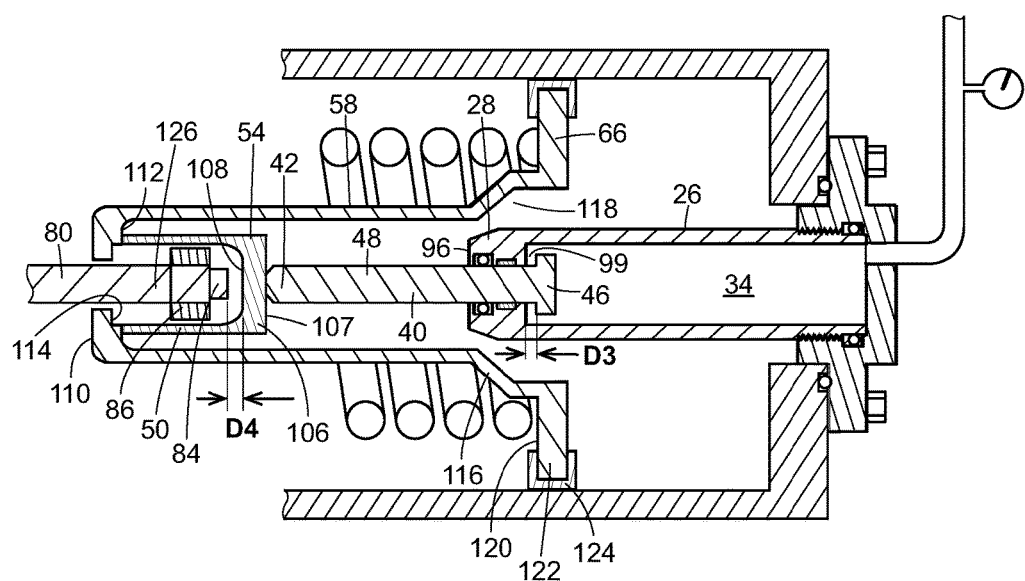
FIG. 4 is a partial sectional view taken of the embodiment of the actuator assembly of FIG. 1 taken along the housing axis of the actuator housing, the section view showing the ram member in a third position.

The inner surface 108 of the end wall 106 is spaced a suitable distance from the first end 52 of the collar 50 such that when the ram member 40 is in the third position illustrated in FIG. 4, the second end 84 of the rod member 80 (or a top surface of the engagement member 86) is separated by a fourth distance D4 (along or parallel to the housing axis 16) from the inner surface 108 of the end wall 106. This fourth distance D4 is greater than the third distance D3, which is the distance between the bottom surface 102 of the piston head 46 from the portion of the cylinder 26 adjacent to the first end 28, such as the end surface 99 of the end wall 96 of the cylinder 26. Because the fourth distance D4 is greater than the third distance D3 (even when the third distance is 0 when the bottom surface 102 of the piston head 46 contacts the end surface 99 of the end wall 96 of the cylinder 26), no portion of the inner surface 108 of the end wall 106 of the collar 50 can contact the second end 84 of the rod member 80 (or a top surface of the engagement member 86). This axial space due to the fourth distance D4 prevents an excessive axial force to be applied to the rod member 80 in a manner that will be described in more detail below.

Referring again to FIG. 2, the actuator assembly 10 additionally includes the spring seat 58 disposed within the actuator interior 24. The spring seat 58 extends along an axis that may be coaxially aligned with the housing axis 16 from the first end 60 to the second end 62 opposite the first end 60. The spring seat 58 includes a base member 64 that extends from along the housing axis 16 from the first end 60 of the spring seat 58 towards the second end 62 of the spring seat 58, and the seating portion 66 of the spring seat 58 may be coupled to the base member 64. The base member 64 includes the least one interior side surface 68 defining (or at least partially defining) the base member interior 70. At least a portion of the base member 64 may be cylindrical, and the cylindrical portion of the base member 64 may extend from the first end 60 to a point between the first end 60 and the second end 62 of the spring seat 58. The distance between the first end 60 of the spring seat 58 and the point between the first end 60 and the second end 62 of the spring seat 58 may be 50% to 90% of total distance (along the housing axis 16) between the first end 60 and the second end 62 of the spring seat 58. In some embodiments, the cylindrical portion of the base member 64 may extend from the first end 60 to a point at or adjacent to the second end 62 of the spring seat 58. In the cylindrical portion of the base member 64, the least one interior side surface 68 may be a single, cylindrical interior side surface 68, which may have a uniform circular cross-sectional shape along the entire cylindrical portion. A diameter of the cylindrical interior side surface 68 may be greater (e.g., 5% to 50% greater) than an outer diameter of the side wall 101 of the cylinder 26 such that the first end 28 of the cylinder 26 is disposed in the base member interior 70. The diameter of the cylindrical interior side surface 68 may also be greater (e.g., 5% to 50% greater) than an outer diameter of the side wall 104 of the collar 50 such that the entire collar 50 is disposed in the base member interior 70.

An end wall 110 may be disposed at the first end 28 of the cylinder 26, and the end wall 110 may be normal or substantially normal to the housing axis 16. The end wall 110 may be defined by an inner surface 112, and the inner surface 112 may define (or at least partially define) the base member interior 70. The base member aperture 72 may be disposed through the end wall 110 of the spring seat 58, and the first end 52 of the collar 50 is in contact with a portion of the end wall 110 of the base member 64 surrounding the base member aperture 72. The inner surface 112 of end wall 110 may also include a depression 114 surrounding the base member aperture 72, and the depression 114 may receive (and may be dimensioned and shaped to receive) a portion of the engagement member 86 when the ram member is in the first position and the second position. The shape of the depression 114 may correspond to that of the engagement member 86 such that the engagement member 86 is prevented from rotating relative to the base member 64 when the portion of the engagement member 86 is received in the depression 114. For example, if the engagement member 86 is a lock nut having a hexagonal shape, the depression may also have a hexagonal shape that is dimensioned to be slightly larger than that of the lock nut, and when a portion of the lock nut is disposed in the depression 114, the lock nut is prevented from rotating within the depression 114. When the ram member 40 is in the third position (illustrated in FIG. 4), the portion of the engagement member 86 received in the depression 114 is axially offset (i.e., offset in a direction parallel or coaxially aligned with the housing axis 16) from the depression 114 formed in the inner surface 112 of end wall 110.

The spring seat 58 also includes the seating portion 66 coupled to (e.g., formed from or with) the base member 64. In some embodiments, the seating portion 66 extends radially (i.e., normal to the housing axis 16) or substantially radially from the base member 64 towards the at least one interior side surface 22 of the actuator housing 14. In some embodiments, the seating portion 66 may be disposed at or adjacent to the second end 62 of the spring seat 58. In some embodiments, the seating portion 66 may extend from an end portion of a transition portion 116 of the base member 64, and the transition portion 116 may extend from an end of the cylindrical portion of the base member 64 to a point at or adjacent to the second end 62 of the spring seat 58. The transition portion 116 of the base member 64 may have portion having a substantially frustoconical shape that increases in diameter as the transition portion 116 extends towards the second end 62 of the spring seat 58, and an interior surface 118 of the transition portion 116 may partially define the base member interior 70.

The seating portion 66 may have a seating surface 120, and the seating surface 120 may be planar or substantially planar. An annular perimeter edge portion 122 that is adjacent to the at least one interior side surface 22 of the actuator housing 14 may have a shape that corresponds to the cross-sectional shape of the at least one interior side surface 22 of the actuator housing 14, and an annular channel portion 124 may be disposed over or at the annular perimeter edge portion 122 such that the annular perimeter edge portion 122 does not directly contact the at least one interior side surface 22 of the actuator housing 14. The annular channel portion 124 may be made of a resilient material, such as rubber, and the annular channel portion 124 my contact the at least one interior side surface 22 of the actuator housing 14 to prevent or limit radial displacement of the spring seat 58 relative to the actuator housing 14.

As illustrated in FIG. 2, the resilient member 74 is disposed within the actuator interior 24, and the resilient member 74 may extend along the housing axis 16 from the first end 76 to the second end 78 opposite the first end 76. The first end 76 of the resilient member 74 may be fixed or coupled to a portion of the actuator housing 14, and the second end 78 of the resilient member 74 may engage the seating surface 120 of the seating portion 66 of the spring seat 58 to bias the second end 62 of the spring seat 58 towards the second end 20 of the actuator housing 14. In some embodiments, the resilient member 74 may be a coil spring, and an outer diameter of the coil spring may be less than the diameter of the at least one interior side surface 22 of the actuator housing 14 and an inner diameter of the coil spring may be greater than an outer diameter of the base member 64 of the spring seat 58.

Still referring to FIG. 2, the actuator assembly 10 further includes the rod member 80 extending along the housing axis 16 from the first end 82 to the second end 84 opposite the first end 82. A portion of the rod member 80 extends through the base member aperture 72 such that the second end 84 of the rod member 80 is disposed within the collar interior 56. The first end 82 of the rod member 80 is directly or indirectly coupled to a closure member 125 (see FIGS. 5A and 5B) of the control valve 12 such that linear movement of the rod member along the housing axis 16 moves (e.g. rotates) the control member between a closed position and an open position in a known manner. The engagement member 86 is coupled to the rod member 80 at or adjacent to the second end 84 of the rod member 80 such that the engagement member 86 is disposed within the collar interior 56. As previously explained, the engagement member 86 may be a lock nut coupled to a threaded portion 126 of the rod member 80 that is disposed at or adjacent to the second end 84 of the rod member 86. The lock nut may threadedly engage the threaded portion 126 of the rod member 86 such that the lock nut is adjustable relative to the rod member 80 during maintenance or servicing. However, in use, the engagement member 86 does not displace or rotate relative to the rod member 80. For example, the shape of the at least one interior side surface 54 of the collar 50 prevents the engagement member 86 from displacing or rotating about the housing axis 16 relative to the rod member 80 and prevents the engagement member 86 from rotating about the housing axis 16 relative to the collar 50. More particularly, if or when the engagement portion 86 is rotated about the housing axis 16, contact between a portion of the side surface 105 of the engagement member 86 and a portion of the at least one interior side surface 54 prevents and/or limits the engagement member 86 from displacing or rotating relative to the rod member 80 and prevents and/or limits the engagement member 86 from rotating relative to the collar 50. The rod member 80 and the engagement member 86 displaceable along the housing axis 16 relative to the collar 50. As previously explained, a portion of the engagement member 86 may be disposed in the depression 114 formed on the inner surface 112 of end wall 110 of the base member 64 of the sparing seat 58 to prevent the engagement member 86 from rotating relative to the base member 64.

In normal use, the closure member 125 (see FIGS. 5A and 5B) of the control valve 12 is moved between an open position and a closed position by the movement of the rod member 80 along the housing axis 16 caused by displacement of the ram member 40 along the housing axis 16 between the first position and the second position. When the ram member 40 is to be maintained in the second position (illustrated in FIG. 3), the rod member 80 is positioned such that the closure member 125 (see FIG. 5B) of the control valve 12 may be in a fully open position. The ram member 40 is maintained in the second position by pressurized fluid that may be introduced, transferred, or communicated to the cylinder interior 34 in any suitable manner. For example, the source 36 may be a manual hand pump (not shown) disposed near the actuator housing 14, or may be an electrical pump (not shown) coupled to a pressure switch that switches the electrical pump when pressure is lower than a threshold pressure. The pressure of the fluid in the cylinder interior 34 may act on the top surface 98 of the piston head 46 to provide a downward axial force (i.e., a force acting along the housing axis 16 in a direction from the second end 20 of the actuator housing 14 towards the first end 18 of the actuator housing 14) acting on the ram member 40 that tends to move the ram member 40 towards the first end 18 of the actuator housing 14. The pressure in the cylinder interior 34 providing the downward axial force on the piston head 46 acts on an effective area of the top surface 98 of the piston head 46 that may be equal to the cross-sectional area (e.g., the cross-sectional diameter normal to the housing axis 16) of the ram stem 48 at a point where the seal 100 (disposed in a surface of the cylinder 26 defining the cylinder aperture 38) sealingly engages the outer surface of the ram stem 48. This cross-sectional area of the ram stem 100 may be equal to the inner diameter of the seal 100 at the point where the seal 100 (disposed in a surface of the cylinder 26 defining the cylinder aperture 38) sealingly engages the outer surface of the ram stem 48. Accordingly, the downward axial force acting on the ram member 40 may be the product of the pressure in the cylinder interior 34 and the cross-sectional area of the ram stem 48 at the point where the seal 100 sealingly engages the outer surface of the ram stem 48.

The first end 42 of the ram member 40 transfers this force to the spring seat 58 by contact with the second end 55 of the collar 50. A downward axial force also acts on the rod member 80 and the engagement member 86, and the downward axial force may be provided by any suitable means, such as a spring or gravity. The downward axial force on the ram member 40 (and the downward axial force on the rod member 80) may be greater than the upward (i.e., in a direction from the first end 18 of the actuator housing 14 towards the second end 20 of the actuator housing 14) force of the resilient member 74 provided by the second end 78 of the resilient member 74 that engages the seating portion 68 of the spring seat 58.

As the spring seat 58 displaces downwardly (i.e., in a direction from the second end 20 of the actuator housing 14 towards the first end 18 of the actuator housing 14) and a downward axial force is applied to the rod member 80, the ram member 40 moves or is maintained in the second position in which the bottom surface 102 of the piston head 46 is disposed the second distance D2 (along or parallel to the housing axis 16) from the portion of the cylinder 26 adjacent to the first end 28, such as the end surface 99 of the end wall 96 of the cylinder 26. The downward displacement of the rod member 80 is limited by a portion of the engagement member 86 engaging the inner surface 112 of end wall 110 of the base member 64 of the spring seat 58. Further downward displacement of the rod member 80 when the closure member 125 is in the fully open position (see FIG. 5B) may be prevented by a mechanical stop 129, such as a hard stop that acts on a yoke 127 to which the first end 82 of the rod member 80 may be coupled. In the second position of the ram member 40, the valve closure member 125 of the control valve 12 is in the fully open position.

The valve closure member 125 of the control valve 12 is maintained in the fully open position by a suitable amount of pressure in the cylinder interior 34 that provides a downward axial force on the ram member 40. However, due to leakage in the system, pressure in the cylinder interior 34 may decrease, and the downward axial force on the ram member 40 also may correspondingly decrease. When the downward axial force acting on the ram member 40 (and the rod member 80) becomes less than the upward axial force provided by the second end 78 of the resilient member 74 engages the seating portion 66 of the spring seat 58, the spring seat 58 is upwardly displaced.

Because a portion of the engagement member 86 engages the inner surface 112 of end wall 110 of the base member 64 of the spring seat 58, the displacement of the spring seat 58 towards the second end 20 of the actuator housing 14 also displaces the engagement member 86—and the rod member 80 coupled to the engagement member 86—towards the second end 20 of the actuator housing. This upward displacement of the rod member 80 along the housing axis 16 towards the second end 20 of the actuator housing 14 may rotate the yoke 127 coupled to the closure member 125 of the control valve 12 such that the closure member 125 is moved to a closed position of FIG. 5A. Eventually, with enough leakage in the cylinder interior 34 (or with an intentional and suitable reduction in pressure in the cylinder interior 34), the ram member 40 moves to the first position (of FIG. 2) in which the bottom surface 102 of the piston head 46 is disposed the first distance D1 (along or parallel to the housing axis 16) from a portion of the cylinder 26 adjacent to the first end 28, such as the end surface 99 of the end wall 96 of the cylinder 26. This first position corresponds to a position in which the valve closure member 125 of the control valve 12 (see FIG. 5A) is in the fully closed position. Typically, when pressure decreases below a threshold level, the source 36 of pressurized fluid (such as an electric pump) may be switched on to displace the ram member 40 from the first position to the second position, thereby moving the closure member 125 of the control valve to the fully-open position.

Figure 5A:
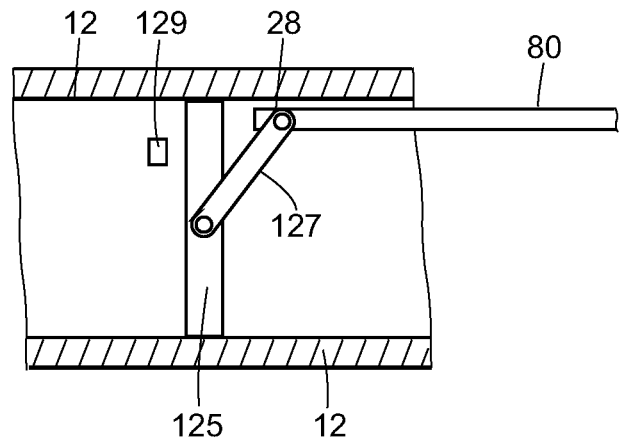
FIG. 5A is a partial sectional view of a control valve having a closure member in a fully-closed position when the ram member in the first position.
Figure 5B:
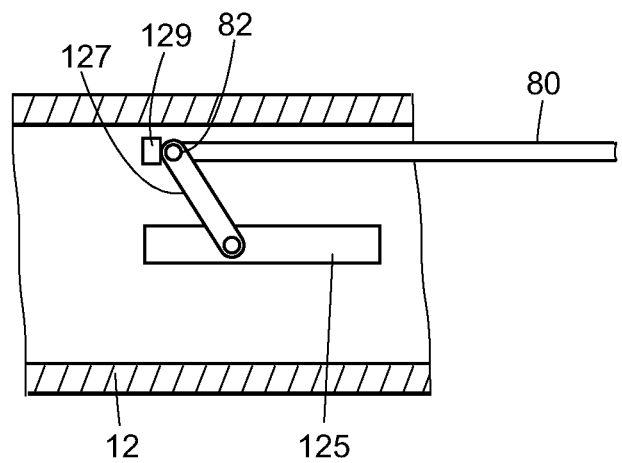
FIG. 5B is a partial sectional view of the control valve of FIG. 5A with the closure member in a fully-open position when the ram member in the second position.

Due to ambient temperature increases (typically caused during hot summer weather), the pressure in the system may increase, thereby increasing pressure in the cylinder interior 34 when the ram member 40 is in the second position of FIG. 3 in which the closure member 125 of the control valve 12 is in the fully open position of FIG. 5A. To prevent the pressure reaching a threshold pressure in which a safety relief valve is triggered, which would require a cycling of the electric pump when the temperature decreases to a normal level, the ram member 40 is adapted to downwardly displace from the second position to the third position, illustrated in FIG. 4. In this third position, the bottom surface 102 of the piston head 46 is disposed the third distance D3 (along or parallel to the housing axis 16) from the portion of the cylinder 26 adjacent to the first end 28, such as the end surface 99 of the end wall 96 of the cylinder 26. The second distance D2 is greater than the third distance D3. The first end 42 of the downwardly displacing ram member 40 downwardly displaces the spring seat 58 by contact with the second end 55 of the collar 50.

However, because the rod member 80 is prevented from further downward axial displacement by a hard stop, and because the engagement member 86 does not contact any portion of the at least one interior side surface 54 of the collar 50, the rod member 80 is not caused to downwardly displace when the ram member 40 moves from the second position to the third position. In addition, as previously explained, the second end 84 of the rod member 80 (or a top surface of the engagement member 86) is separated by the fourth distance D4 (along or parallel to the housing axis 16) from the inner surface 108 of the end wall 106 when the ram member is in the third position. Because the fourth distance D4 is greater than the third distance D3 (even when the third distance is 0 mm when the bottom surface 102 of the piston head 46 contacts the end surface 99 of the end wall 96 of the cylinder 26), no portion of the inner surface 108 of the end wall 106 of the collar 50 can contact the second end 84 of the rod member 80 (or a top surface of the engagement member 86). This axial space due to the fourth distance D4 prevents an excessive downward axial force to be applied to the rod member 80 that is transferred to the mechanical stop preventing further downward displacement of the rod member 80. Thus, pressure increases in the fluid due to thermal expansion can be safely mechanically absorbed by the ram member 40, the spring seat 58, and the resilient member 74 while avoiding an increase in threshold pressure that triggers a relief valve and requires a cycling of the electric pump or a manual application of pressure into the cylinder interior 34.

While various embodiments have been described above, this disclosure is not intended to be limited thereto. Variations can be made to the disclosed embodiments that are still within the scope of the appended claims. For example, the closure member has been illustrated as a butterfly valve closure, but any suitable type of closure member is contemplated. In addition, the first position may correspond to a position in which the closure member is in an open position and the second position may correspond to a position in which the closure member is in a fully-closed position. Moreover, while directions have been described as upwards or downwards (for example), one having ordinary skill in the art would recognize that these directions are for reference purposes only and that the actuator housing may be disposed in any orientation with the relative directions of upwards or downwards remaining constant.

What is claimed is:

1. An actuator assembly, the actuator assembly comprising:

an actuator housing extending along a housing axis from a first end to a second end opposite the first end, the actuator housing having at least one interior side surface defining an actuator interior;

a cylinder extending along the housing axis from a first end to a second end opposite the first end, the second end of the cylinder being adjacent to the second end of the actuator housing, the cylinder having at least one interior side surface defining a cylinder interior, the cylinder interior being in fluid communication with a source of pressurized fluid, wherein the cylinder is disposed at least partially within the actuator interior, and wherein the cylinder has a cylinder aperture at the first end of the cylinder;

a ram member extending along the housing axis from a first end to a second end opposite the first end, the second end of the ram member being disposed within the cylinder interior and the first end of the ram member being disposed outside of the cylinder interior, the ram member having a piston head disposed at the second end of the ram member, and a ram stem extends from the piston head to the first end of the ram member, wherein a portion of the ram stem is slidably received in the cylinder aperture, wherein a cross-sectional area of the piston head is greater than a cross-sectional area of the ram stem, wherein pressure from the source of pressurized fluid within the cylinder interior acts on the piston head to move the ram member relative to the cylinder between a first position and a second position;

a collar extending along the housing axis from a first end to a second end opposite the first end, the second end of the collar being adjacent to or in contact with the first end of the ram member, the collar having at least one interior side surface defining a collar interior;

a spring seat disposed within the actuator interior, the spring seat extending along the housing axis from a first end to a second end opposite the first end, the spring seat having a base member that extends along the housing axis from the first end of the seat spring towards the second end of the spring seat, the spring seat also including a seating portion coupled to the base member, the base member having at least one interior side surface defining a base member interior, wherein the base member has a base member aperture at the first end of the spring seat, and wherein the first end of the collar is in contact with a portion of the base member surrounding the base member aperture;

a resilient member disposed within the actuator interior, the resilient member extending along the housing axis from a first end to a second end opposite the first end, and the second end of the resilient member engages the seating portion of the spring seat to bias the second end of the spring seat towards the second end of the actuator housing;

a rod member extending along the housing axis from a first end to a second end opposite the first end, wherein a portion of the rod member extends through the base member aperture such that the second end of the rod member is disposed within the collar interior, the first end of the rod member adapted to be directly or indirectly coupled to a control member of a control valve; and an engagement member coupled to the rod member at or adjacent to the second end of the rod member such that the engagement member is disposed within the collar interior, wherein the rod member and the engagement member are displaceable relative to the collar such that the second end of the rod member does not contact a portion of the second end of the collar.

2. The actuator assembly of claim 1, wherein in the first position, a bottom surface of the piston head of the ram member is disposed a first distance along the housing axis from a portion of the cylinder adjacent to the first end of the cylinder, and
   wherein in the second position, the bottom surface of the piston head of the ram member is disposed a second distance along the housing axis from the portion of the cylinder adjacent to the first end of the cylinder, and the first distance is greater than the second distance.

3. The actuator assembly of claim 2, wherein pressure from the source of pressurized fluid within the cylinder interior acts on the piston head to move the ram member relative to the cylinder from the second position to a third position, wherein in the third position, the bottom surface of the piston head of the ram member is disposed a third distance along the housing axis from the portion of the cylinder adjacent to the first end of the cylinder, and the second distance is greater than the third distance.

4. The actuator assembly of claim 3, wherein in the third position, the second end of the rod member or a top surface of the engagement member is separated by a fourth distance along the housing axis from an inner surface of an end wall disposed at the second end of the collar, and the fourth distance is greater than the third distance.

5. The actuator assembly of claim 4, wherein an inner surface of an end wall of the base member includes a depression surrounding the base member aperture, and the depression receives a portion of the engagement member when the ram member is in the first position and the second position.

6. The actuator assembly of claim 5, wherein the portion of the engagement member is offset from the depression when the ram member is in the third position.

7. The actuator assembly of claim 1, wherein an annular gap is disposed between a side surface of the engagement member and the at least one interior side surface of the collar when the engagement member and the rod member displace along the housing axis.

8. The actuator assembly of claim 7, wherein the engagement member is a lock nut coupled to a threaded portion of the rod member.

9. The actuator assembly of claim 8, wherein when the engagement member is rotated about the housing axis, contact between a portion of the side surface of the engagement member and a portion of the at least one interior side surface of the collar limits the engagement member from rotating about the housing axis relative to the rod member and the collar.

10. The actuator assembly of claim 1, wherein the at least one interior side surface defining the actuator interior is cylindrical.

11. The actuator assembly of claim 1, wherein a seal is disposed in a surface of the cylinder defining the cylinder aperture to sealingly engage the portion of the ram stem slidably received in the cylinder aperture.

12. The actuator assembly of claim 1, wherein the first end of the resilient member is fixed to a portion of the actuator housing at or adjacent to the first end of the actuator housing or between the first end of the actuator housing and the second end of the actuator housing.

13. The actuator assembly of claim 1, wherein the resilient member is a coil spring.

14. The actuator assembly of claim 13, wherein an outer diameter of the coil spring is less than a diameter of the at least one interior side surface of the actuator housing and an inner diameter of the coil spring is greater than an outer diameter of the base member of the spring seat.

15. The actuator assembly of claim 1, wherein the seating portion of the spring seat is at or adjacent to the second end of the spring seat.

16. The actuator assembly of claim 15, wherein at least a portion of the base member is cylindrical, the portion of the base member extending from the first end to a point between the first end and the second end of the spring seat, and wherein the seating portion extends radially from the cylindrical base member.

17. The actuator assembly of claim 16, wherein a transition portion of the base member extends between the portion of the base member that is cylindrical and the seating portion, the transition portion having a frustoconical shape.

18. The actuator assembly of claim 1, wherein the second end of the cylinder is removably secured to the second end of the actuator housing.

19. A method of assembling an actuator assembly, the method comprising:
   disposing a cylinder within an actuator interior of an actuator housing, the actuator housing extending along a housing axis from a first end to a second end, and wherein the cylinder extends along the housing axis from a first end to a second end, the second end of the cylinder being fixed to the second end of the actuator housing, disposing a first end of a ram member outside of the cylinder and within the actuator interior;
   disposing a second end of the ram member within a cylinder interior of the cylinder such that pressure of a fluid introduced into the cylinder interior acts on the second end of the ram member to displace the ram member along the housing axis;
   disposing a collar within the actuator interior, the collar having a first end and a second end, wherein the second end of the collar is contacted by the first end of the ram member;
   disposing a spring seat within the actuator interior, wherein the first end of the collar engages a first portion of a spring seat;
   securing a first end of a resilient member within the actuator interior such that a second free end of the resilient member engages a second portion of the spring seat to bias the spring seat towards the second end of the actuator housing;
   disposing at least a portion of a rod member within the actuator interior, the rod member extending along an axis from a first end to a second end, wherein the second end of the rod member is slidably disposed in a collar interior of the collar; and
   coupling an engagement member to the rod member at or adjacent to the second end of the rod member such that the engagement member is disposed within the collar interior, wherein the rod member and the engagement member are displaceable relative to the collar such that the second end of the rod member does not contact a portion of the second end of the collar,
   wherein as the ram member displaces towards the first end of the actuator housing, the second end of the rod member displaces towards the first end of the actuator housing until a closure member coupled to the first end of the rod member is in a fully-closed position, and
   wherein as the ram member displaces towards the second end of the actuator housing, the second end of the rod member displaces towards the second end of the actuator housing such that the closure member is in an open position; and wherein as the ram member displaces towards the first end of the actuator housing when the closure member is in the fully-closed position due to thermal expansion of the fluid in the cylinder interior, the first end of the ram member displaces the collar towards the first end of the actuator housing but does not displace the rod member.

20. The method of claim 19, wherein a cross-sectional shape of the collar interior corresponds to a cross-sectional shape of the engagement member to prevent or limit the engagement member from rotating relative to the collar.

21. The method of claim 19, wherein the spring seat extends along the housing axis from a first end to a second end, and wherein the first portion of the spring seat is disposed at or adjacent to the first end of the spring seat and the second portion of the spring seat is disposed at or adjacent to the second end of the spring seat.

\* \* \* \* \*

UNITED STATES PATENT AND TRADEMARK OFFICE
CERTIFICATE OF CORRECTION

PATENT NO. : 10,364,912 B2
APPLICATION NO. : 15/236945
DATED : July 30, 2019
INVENTOR(S) : William K. LeBlanc et al.

It is certified that error appears in the above-identified patent and that said Letters Patent is hereby corrected as shown below:

In the Specification

At Column 10, Line 60, "rod member 86." should be -- rod member 80. --.

At Column 10, Line 61, "rod member 86" should be -- rod member 80 --.

At Column 11, Line 16, "sparing" should be -- spring --.

Signed and Sealed this
Nineteenth Day of July, 2022

Katherine Kelly Vidal
*Director of the United States Patent and Trademark Office*